(12) United States Patent
Han et al.

(10) Patent No.: US 9,106,178 B2
(45) Date of Patent: Aug. 11, 2015

(54) APPARATUS FOR CONTROLLING MOTOR FOR ELECTRIC VEHICLE AND METHOD FOR REDUCING TORQUE RIPPLE USING THE SAME

(71) Applicants: Seungdo Han, Seoul (KR); Junyoung Lim, Seoul (KR); Youngboong Kim, Seoul (KR); Hokyoung Lim, Seoul (KR)

(72) Inventors: Seungdo Han, Seoul (KR); Junyoung Lim, Seoul (KR); Youngboong Kim, Seoul (KR); Hokyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 13/907,284

(22) Filed: May 31, 2013

(65) Prior Publication Data

US 2014/0062350 A1 Mar. 6, 2014

(30) Foreign Application Priority Data

Aug. 30, 2012 (KR) ........................ 10-2012-0095830

(51) Int. Cl.
- H02P 1/00 (2006.01)
- H02P 31/00 (2006.01)
- H02P 6/10 (2006.01)
- H02P 21/10 (2006.01)

(52) U.S. Cl.
CPC ...... *H02P 31/00* (2013.01); *H02P 6/10* (2013.01); *H02P 21/10* (2013.01); *Y02T 10/7005* (2013.01); *Y02T 10/7077* (2013.01); *Y02T 10/7258* (2013.01)

(58) Field of Classification Search
CPC . Y02T 10/7005; Y02T 10/7077; Y02T 10/70; B60W 10/08; B60W 20/00
USPC .......................................................... 318/139
See application file for complete search history.

(56) References Cited

U.S. PATENT DOCUMENTS

| | | | |
|---|---|---|---|
| 5,726,558 A * | 3/1998 | Umeda et al. | 322/27 |
| 7,696,709 B2 * | 4/2010 | Endo et al. | 318/432 |
| 7,723,945 B2 * | 5/2010 | Okamura | 318/805 |
| 2008/0042605 A1 * | 2/2008 | Subrata et al. | 318/449 |
| 2010/0194320 A1 * | 8/2010 | Kaneko | 318/400.23 |

FOREIGN PATENT DOCUMENTS

| | | |
|---|---|---|
| JP | 09-37416 A | 2/1997 |
| JP | 2000-324898 A | 11/2000 |
| JP | 2010-233385 A | 10/2010 |
| KR | 10-2011-0109433 A | 10/2011 |

* cited by examiner

*Primary Examiner* — Shawki S Ismail
*Assistant Examiner* — Bradley Brown
(74) *Attorney, Agent, or Firm* — McKenna Long Aldridge LLP

(57) ABSTRACT

An apparatus controlling an electric vehicle motor and a method to reduce torque ripple using the same are provided. A field current flowing in a rotor field coil is controlled by generating a negative phase ripple current with respect to torque ripple according to each position of the rotor, allowing torque ripple of the motor to be reduced without degrading output torque. Additionally, in an operation region of a high torque section, torque ripple is reduced by controlling a field current by increasing an AC component of a negative phase ripple current, and in an operation region of a low torque section, torque ripple is reduced by controlling a field current by decreasing an AC component of a negative phase ripple current. That is, torque ripple of a motor can be reduced by controlling only a field current.

19 Claims, 12 Drawing Sheets

NUMBER OF PERIODS PER ROTATION

| | 8 POLE/6 SLOT | 4 POLE/ 6 SLOT | 10 POLE/60 SLOT | 8 POLE/48 SLOT | FORMULA |
|---|---|---|---|---|---|
| TORQUE RIPPLE | 24 | 12 | 30 | 24 | CONSTANT (3) x NUMBER OF POLES |
| COGGING RIPPLE | 24 | 12 | 60 | 48 | LCM(NUMBER OF SLOTS , NUMBER OF POLES) |

APPARATUS FOR CONTROLLING MOTOR FOR ELECTRIC VEHICLE AND METHOD FOR REDUCING TORQUE RIPPLE USING THE SAME

The present disclosure relates to subject matter contained in priority Korean Application No. 10-2012-0095830, filed on Aug. 30, 2012, which is herein expressly incorporated by reference in its entirety.

1. FIELD OF THE DISCLOSURE

The present disclosure relates to an apparatus for controlling an electric vehicle motor and a method for reducing torque ripple using the same, and more particularly, to an apparatus for controlling a motor for an electric vehicle capable of reducing torque ripple of a motor by controlling a field current of the motor with a negative phase ripple current of a torque ripple generated according to a position of a rotor, and a method for reducing torque ripple using the same.

2. DESCRIPTION OF THE RELATED ART

Recently, eco-friendly vehicles such as electric vehicles or hybrid vehicles have come to prominence due to energy depletion and environmental pollution. An eco-friendly vehicle includes a motor for generating driving power by using electricity stored in a battery, and in this case, a DC motor is generally used.

Generally, a DC motor is comprised of a stator configured as a magnet and a rotor configured as a field winding. The field winding of the rotor is connected to an external DC power source through a brush, and here, as the rotor rotates, polarity of the external power source connected to the brush continues to be changed and therefore a direction of a magnetic field generated in the rotor also continues to be changed. That is, a magnetic field of the rotor is maintained to have the same polarity with respect to a magnetic field of the stator, generating the rotational force of the motor.

Meanwhile, in case of a DC motor used in an electric vehicle or a hybrid vehicle, it is important to secure reliability of the motor by attaining a high output density, high efficiency, and a low level of noise (a low level of vibration). To this end, it is important to reduce or cancel out torque ripple, which is a main cause of noise and vibration during operation of the motor.

Schemes for reducing torque ripple of a DC motor include a scheme of reducing cogging torque ripple by optimizing a shape of a motor when the motor is manufactured and assembled, a scheme of reducing torque ripple through application of a sinusoidal current, and the like. However, designing a motor such that a current distribution has perfectly sinusoidal waves is very complicated and requires a precise designing process. In the case of applying skew to a stator or a rotor of a motor to reduce cogging torque ripple or in the case of manufacturing a stator or a rotor to have a sinusoidal shape, e.g., an arc shape, to maintain sinusoidal waves, the overall output torque is degraded reducing the motor's output efficiency.

SUMMARY

One embodiment of the present disclosure provides an apparatus controlling an electric vehicle motor capable of controlling a field current flowing in a field coil of a rotor of a motor by generating a negative phase ripple current with respect to torque ripple by positions of the rotor, and thus reducing torque ripple of the motor without degrading output torque. Another embodiment of the present disclosure provides a method for reducing torque ripple using the apparatus described herein.

According to an aspect of the present disclosure, there is provided an apparatus controlling an electric vehicle motor, including: a motor including a stator having an armature coil and a rotor having a field coil; a rotor position detection unit to detect a position of the rotor; a field current detection unit to detect a field current flowing in the field coil; and a field current control unit having a feedback control unit for feedback-controlling the detected field current, wherein an operation region is determined based on a torque reference received according to an accelerator angle set by a driver and a rotation speed of the motor calculated according to a signal received from the rotor position detection unit, and wherein is the field current control unit generates a negative phase ripple current for each operation region using a baseline field current detected at each position of the rotor, and feedback-controlling the field current with the generated negative phase ripple current to reduce torque ripple of the motor.

According to another aspect of the present disclosure, there is provided a method to reduce torque ripple by an apparatus controlling an electric vehicle motor having a motor including a stator with an armature coil and a rotor with a field coil, including: detecting a position of the rotor; detecting a field current flowing in the field coil; sampling torque ripple of a motor generated according to each position of the rotor; determining a current operation region based on a torque reference received according to an accelerator angle set by a driver and a rotation speed of the motor calculated according to a signal received from a rotor position detection unit; generating a negative phase ripple current as a scaled function of the sampled torque ripple for each operation region; and feedback-controlling the field current with the negative phase ripple current corresponding to a current operation region.

In the case of the apparatus controlling an electric vehicle motor and a method for reducing torque ripple using the same according to embodiments of the present disclosure, since a field current flowing in a field coil of a rotor is controlled by generating a negative phase ripple current with respect to torque ripple according to each position of a rotor of a motor, torque ripple of the motor can be reduced without degrading output torque.

In addition, in the case of the apparatus controlling an electric vehicle motor and a method for reducing torque ripple using the same according to embodiments of the present disclosure, in an operation region of a high torque section, torque ripple is reduced by controlling a field current by increasing an AC component of a negative phase ripple current, and in an operation region of a low torque section, torque ripple is reduced by controlling a field current by decreasing an AC component of a negative phase ripple current. That is, torque ripple of a motor can be reduced by controlling only a field current without controlling a phase of an output current applied to an armature coil of a stator.

The foregoing and other objects, features, aspects and advantages of the present disclosure will become more apparent from the following detailed description when taken in conjunction with the accompanying drawings.

DETAILED DESCRIPTION

Figure 1:
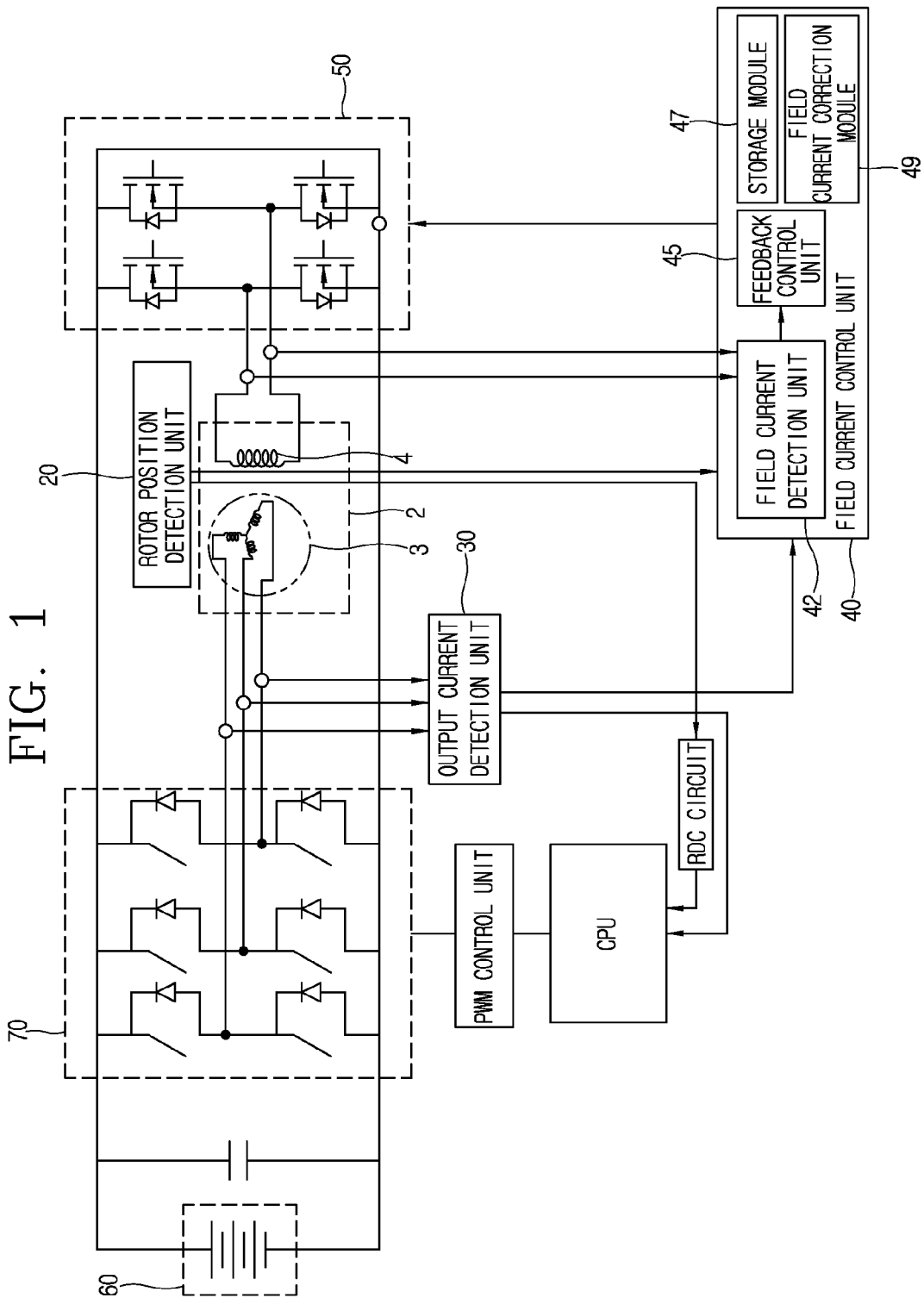
FIG. 1 is a circuit diagram of a configuration of an apparatus for controlling a motor for an electric vehicle according to an embodiment of the present disclosure.

FIG. 1 is a circuit diagram of a configuration of an apparatus for controlling a motor for an electric vehicle according to an embodiment of the present disclosure. As illustrated, an apparatus for controlling a motor for an electric vehicle includes a motor 2 comprised of a stator having an armature coil 3 and a rotor having a field coil 4, a field current control unit 40 and a field current control circuit configured to control a field current, a rotor position detection unit 20 configured to detect a position of the rotor of the motor, an output current detection unit 30 configured to detect a 3-phase AC current applied to the motor, a battery 60 configured to supply charged battery power, and an inverter 70 configured to convert DC power of the battery 60 into AC power to provide driving power to the motor 2.

The rotor position detection unit 20 is devised to measure a rotational position of the rotor, which may be, for example, a resolver provided in a front stage of the motor 2.

The field current control unit 40 includes a field current detection unit 42 and a feedback control unit 45. The field current detection unit 42 detects a field current $I_f$ value flowing in the field coil 4 based an ON/OFF ratio of a switching element such as, for example, a MOSFET. Meanwhile, the feedback control unit 45 feedback-controls the detected field current $I_f$ by transferring a control signal for an ON/OFF operation of the switching element provided in the field current control circuit 50.

Also, the field current control unit 40 generates a negative phase ripple current with respect to torque ripple generated in each operation region by using a field current detected from each position of the rotor.

Here, the operation region may be divided into a first operation region in which torque is uniform according to a rotation speed of the motor 2, and a second operation region in which torque is reduced according to a rotation speed of the motor 2.

Figure 3:
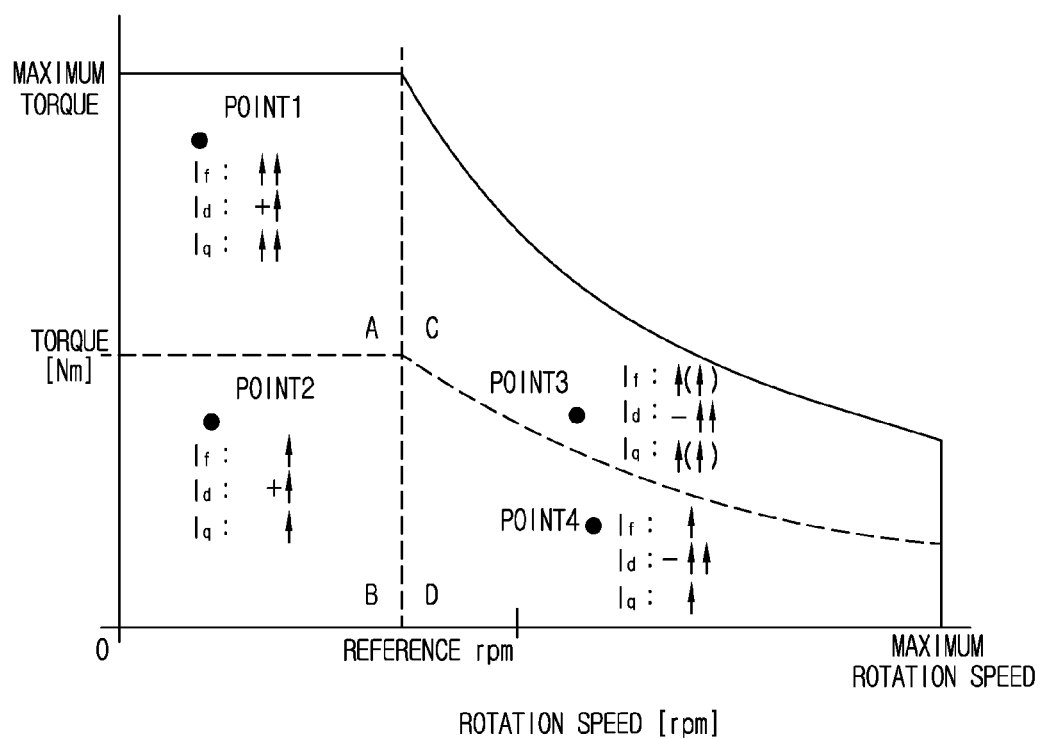
FIG. 3 is a graph showing a magnitude of a field current ($I_f$) corresponding to a negative phase ripple current for reducing torque ripple in each operation region based on torque and a motor rotation speed according to an embodiment of the present disclosure.

Referring to the graph in FIG. 3, regions A and B correspond to a first operation region in which torque is uniform or constant, and regions C and D correspond to a second operation region in which torque is reduced as a rotation speed is increased. Also, a current operation region is determined based on a torque reference received according to an accelerator angle set by a driver and a rotation speed of the motor calculated according to a signal received from the rotor position detection unit 20.

The negative phase ripple current may be generated by using a DC field current detected through the field current detection unit 42. More specifically, torque ripple is extracted according to each rotational position of the rotor detected through the rotor position detection unit 20 and scaled, and thereafter, a negative phase ripple current having the same magnitude as that of the extracted torque ripple and the opposite phase is generated by using the DC field current in a corresponding rotational position.

The field current control unit 40 reduces torque ripple of the motor 2 using the generated negative phase ripple current by controlling the magnitude and phase of the detected field current $I_f$.

More specifically, the field current control unit 40 controls the field current $I_f$ such that a magnitude thereof is increased as an operation region based on a torque reference and a rotation speed of the motor is shifted from a low torque section of the first operation region having a uniform torque toward a high torque section of the first operation region. Also, the field current control unit 40 controls a duty ratio of a switching element provided in the field current circuit such that a magnitude of the field current $I_f$ is increased as the operation region based on a torque reference and a rotation speed of the motor is shifted from the low torque section of the second operation region in which torque is reduced as a rotation speed of the motor is increased, toward the high torque section of the second operation region.

Meanwhile, in case that the operation region based on an input torque reference and a rotation speed of the motor moves from the high torque section of the first operation region having uniform torque to the high torque section of the second operation region, the field current control unit 40 controls the field current circuit 50 such that the magnitude of the field current $I_f$ is reduced. Also, when the operation region moves from the low torque section of the first operation region having a uniform torque to the low torque section of the second operation region in which torque is reduced, the field current control unit 40 controls the field current circuit 50 such that a magnitude of the field current $I_f$ is reduced.

Also, when a current operation region based on an input torque reference and a rotation speed of the motor is the high torque section of the first operation is region or the second operation region, the field current control unit 40 increases an AC component of the generated negative phase ripple current to reduce torque ripple of the motor.

Also, when a current operation region based on an input torque reference and a rotation speed of the motor is the low torque section of the first operation region or the second operation region, the field current control unit 40 reduces an AC component of the generated negative phase ripple current to reduce torque ripple of the motor.

Total output torque of the motor is the sum of magnetic torque, reluctance torque, and cogging torque. Among them, magnetic torque includes both the field current $I_f$ component and torque generation current $I_q$ component of an output current, so a magnitude of the negative phase ripple current generated by using the field current has characteristics that it is proportional to the magnitude of the torque generation current $I_q$. Thus, the field current control unit 40 may control a magnitude of the field current by generating a negative phase ripple current proportional to a magnitude of the torque generation current $I_q$ which has been converted into a current on a 2-phase synchronous coordinate system from the output current detected through the output current detection unit 30.

Also, the field current control unit 40 includes a storage module 47 and a field current correction module 49.

The storage module 47 stores positions of the rotor corresponding to negative phase ripple currents and magnitudes of field currents for reducing torque in the respective operation regions, in the form of a look-up table in advance. Data values of the look-up table may be obtained by experimenting on the tendency of torque ripple generated in each operation region and analyzing the same. The field current correction module 49 corrects a magnitude of a field current by reading a position of the rotor and a magnitude of a field current corresponding to a current operation region determined according to a received torque reference and a calculated rotation speed of the motor, from the look-up table stored in storage module 47. In this manner, torque ripple of the motor can be reduced by correcting the detected field current by using the read magnitude of the field current as a field current reference value.

In an embodiment of the present disclosure, a magnitude of torque ripple is in inverse proportional to the number of poles of the rotor. That is, as the number of rotor poles is increased, torque ripple is reduced. For example, referring to FIG. 14, it can be seen that torque ripple is the most severe when the number of the poles of the rotor is smallest, i.e., 4, and torque ripple is relatively stable when the number of the poles of the rotor is the greatest, i.e., 10.

Figures 14, 15:
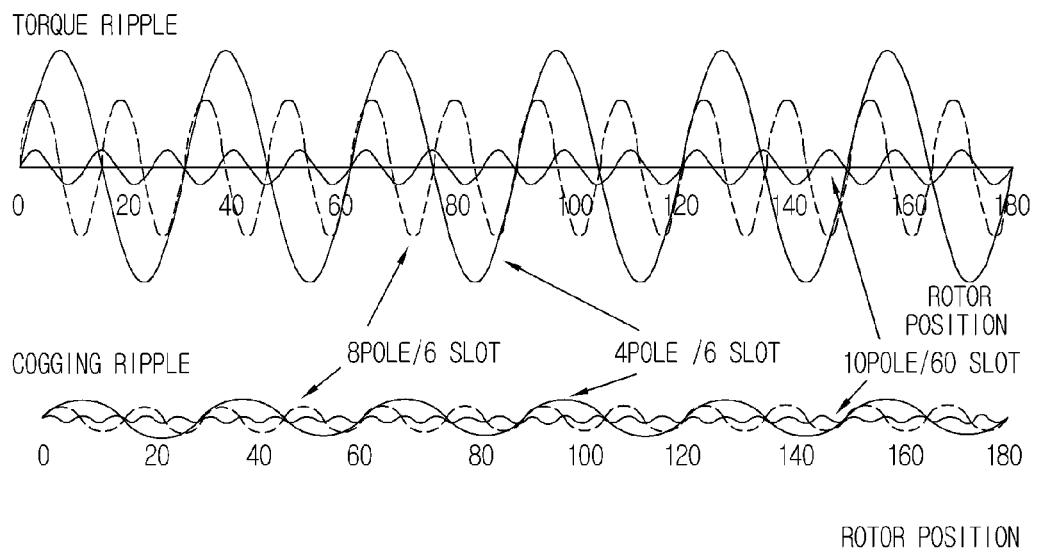
FIG. 14 is a graph showing waveforms of torque ripple and cogging torque according to the number of rotor poles and the number of stator slots according to an embodiment of the present disclosure.
FIG. 15 is a table showing a comparison of the number of periods of torque ripple and cogging torque ripple per rotation according to the number of rotor poles and the number of stator slots according to an embodiment of the present disclosure.

Meanwhile, the number of frequency periods per rotation of ripple of cogging torque periodically appearing according to a rotational position of the rotor is the least common multiple of the number of poles of the rotor and the number of slots of the stator. Referring to FIG. 15, when the least common multiple value of the number of poles of the rotor and the number of the slots of the stator is small, for example, in the case of 4 poles/6 slots, a frequency period calculated per rotation is long and ripple is large. But, when the least common multiple value of the number of poles of the rotor and the number of the slots of the stator is large, for example, in the case of 10 poles/60 slots, a frequency period calculated per rotation is short and ripple is small. Also, since total output torque of the motor is the sum of magnetic torque, reluctance torque, and cogging torque, a change in ripple of the cogging torque according to the number of poles of the rotor is proportional to a change in torque ripple. Referring to FIG. 14, it can be seen that changes in the waveforms of cogging torque according to the number of poles of the rotor and the number of slots of the stator are proportional to changes in the waveforms of the torque ripple.

The inverter 70 converts DC power from the battery 60 into 3-phase AC current according to operational conditions of a vehicle and supplies the 3-phase AC current to the armature coil 3 to drive the motor 2. To this end, as shown in FIG. 1, the inverter 70 is connected to a central processing unit (CPU), a pulse width modulation (PWM) control unit, and a resolver-to-digital convertor (RDC) circuit. Here, the RDC circuit receives a signal regarding a position of the rotor of the motor from the rotor position detection unit 20, calculates a speed of the motor, and applies the calculated speed of the motor to the CPU.

Also, the inverter 70 includes an inverter circuit configured as a switching element such as a MOSFET, or the like, and a rectifying circuit configured as a diode connected in parallel to each switching element. As illustrated in FIG. 1, the inverter 70 includes U-phase upper and lower arms, V-phase upper and lower arms, and W-phase upper and lower arms, and the upper and lower arms of the respective phases are connected to the armature coil 3 of the motor 2. Also, a duty ratio is controlled as a rotation position detected by the rotor position detection unit 20 and a PWM signal corresponding to a 3-phase AC current detected by the output current detection unit 30 are applied to a switching element of the inverter 70.

In an embodiment of the present disclosure, in order to stably reduce torque ripple according to a change in rotation speed of the motor, only the field current $I_f$ applied to the rotor coil is controlled and a pulse width modulation pattern of the inverter 70 is not controlled. Thus, the magnetic flux generation current $I_d$ and the torque generation current $I_q$ which have been converted from the 3-phase output current detected by the output current detection unit 30 are used only to analyze torque ripple, and phases of the U, V, and W-phase currents are not controlled to reduce torque ripple.

The output current detection unit 30 detects an output current of the armature coil 3. The detected output current may be converted into the magnetic flux generation current $I_d$ and the torque generation current $I_q$ as currents on the 2-phase synchronous coordinate system, and in this case, a magnitude of the negative phase ripple current according to an embodiment of the present disclosure is proportional to a magnitude of the torque generation current $I_q$.

Figure 2:
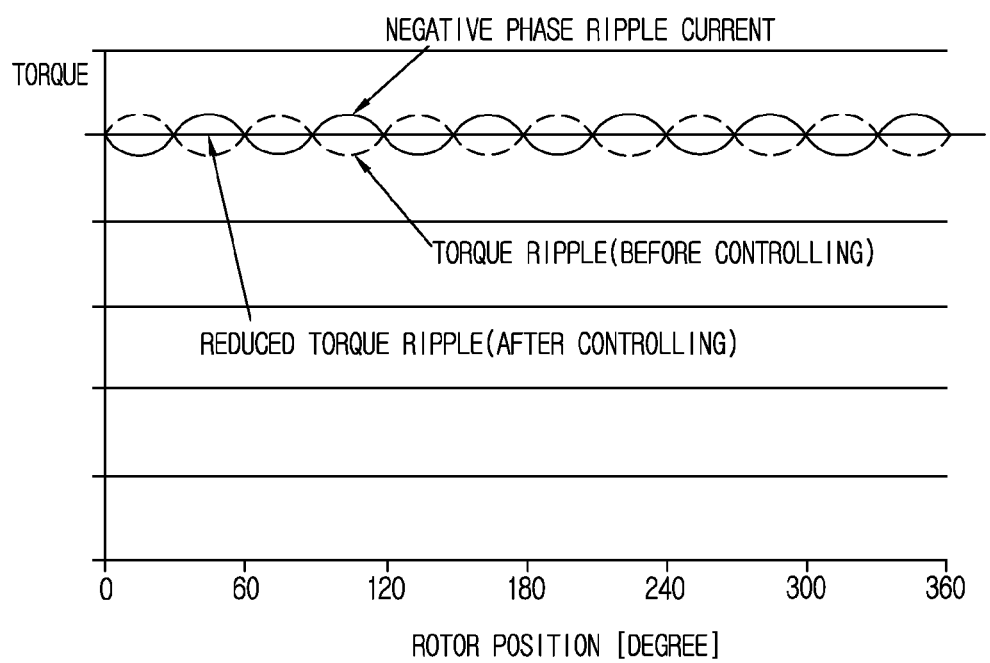
FIG. 2 is a graph showing the result obtained by canceling out torque ripple generated according to each position of a rotor by using a negative phase ripple current according to an embodiment of the present disclosure.

FIG. 2 is a graph showing a result obtained by canceling out torque ripple generated in each position of the rotor by introducing a negative phase ripple current using the apparatus for controlling a motor for an electric vehicle as described above. As illustrated in FIG. 2, the negative phase ripple current generated by using a field current has the same magnitude and the opposite phase. Thus, it can be seen that the torque ripple is reduced or canceled out when the negative phase ripple current is applied thereto. One advantage is that the torque ripple can be reduced without degrading output torque.

FIG. 3 is a graph showing a magnitude of a field current $I_f$ corresponding to a negative phase ripple current for reducing torque ripple in each operation region based on torque and a motor rotation speed according to an embodiment of the present disclosure.

Here, arrows shown in FIG. 3 indicate magnitudes of current corresponding to If, Id and Iq, respectively (current magnitude: ↑↑>↑(↑)>↑). (+) or (−) sign of Id denotes a current direction of d-axis current. For examples, (+) sign may indicate that a stator current is present within the first quadrant on d-q plane. Also, (−) sign may indicate that a stator current is present within the second quadrant on d-q plane.

Each operation region is determined according to a torque reference received according to an accelerator angle set by a driver and a rotation speed of the motor calculated according to a signal received from the rotor position detection unit 20.

In detail, as illustrated in FIG. 3, the operation regions are classified into first operation regions, regions A and B, having uniform torque according to a rotation speed of the motor and second operation regions, regions C and D, in which torque is reduced according to a rotation speed of the motor. Preferably, as the received torque reference is shifted from a low torque section to a high torque section, that is, the received torque reference transitions from the region B to the region A or from the region D to the region C, the field current $I_f$ is controlled to have an increased magnitude. Also, it can be seen that magnitudes of the field currents $I_f$ in the respective regions are proportional to magnitudes of the torque generation currents $I_q$, i.e., currents on the 2-phase synchronous reference which have been converted from the 3-phase output currents of the inverter. This is because the magnetic torque includes all the components of the field current $I_f$ and to the torque generation current $I_q$.

In this manner, after the tendency of the torque ripple is experimentally analyzed based on the magnitudes of the field currents $I_f$ and the torque generation currents $I_q$ detected from the respective operation regions, a negative phase ripple current for reducing or canceling out the torque ripple is generated using the detected field current $I_f$. To this end, phase angles of negative phase ripple currents for reducing torque ripple generated in the respective operation regions, that is, positions of the corresponding rotor, are detected, based on which a look-up table is generated. Therefore, pairs of magnitudes of field currents $I_f$ corresponding to negative phase ripple currents with respect to torque ripple and positions of the rotor in the respective operation regions are stored in the form of a look-up table in advance.

Thereafter, which of the regions among A, B, C, and D, a current operation region corresponds to is determined. This determination is made according to a torque reference value based on an accelerator angle set by the driver and a rotation speed value of the motor according to a signal received from the rotor position detection unit. A magnitude of the field current $I_f$ corresponding to a negative phase ripple current with respect to torque ripple corresponding to the determined current operation region and a position of the rotor are read from the previously stored look-up table, and the field current $I_f$ is controlled.

In region A corresponding to a high torque section of the first operation region having uniform torque and in region C corresponding to a high torque section of the second operation region in which torque is reduced as the rotation speed of the motor is increased, torque ripple of the motor is reduced by considerably increasing an AC component of the generated negative phase ripple current. In this manner, since the proportion of the magnetic torque in the output torque is large in the high torque section, the torque ripple can be easily reduced by controlling the field current $I_f$.

In region B corresponding to a low torque section of the first operation region having uniform torque and in region D corresponding to a low torque section of the second operation region having torque reduced as the rotation speed of the motor is increased, torque ripple of the motor can be reduced by reducing an AC component of the generated negative phase ripple current.

In this case, however, in an embodiment of the present disclosure, since torque ripple is reduced or canceled out only by controlling the field current $I_f$, phase control is not performed on the magnetic flux generation current $I_d$ and the torque generation current $I_q$ as 3-phase output currents of the inverter or currents of the 2-phase synchronous coordinate system which have been converted from the 3-phase output currents of the inverter.

Figure 4:
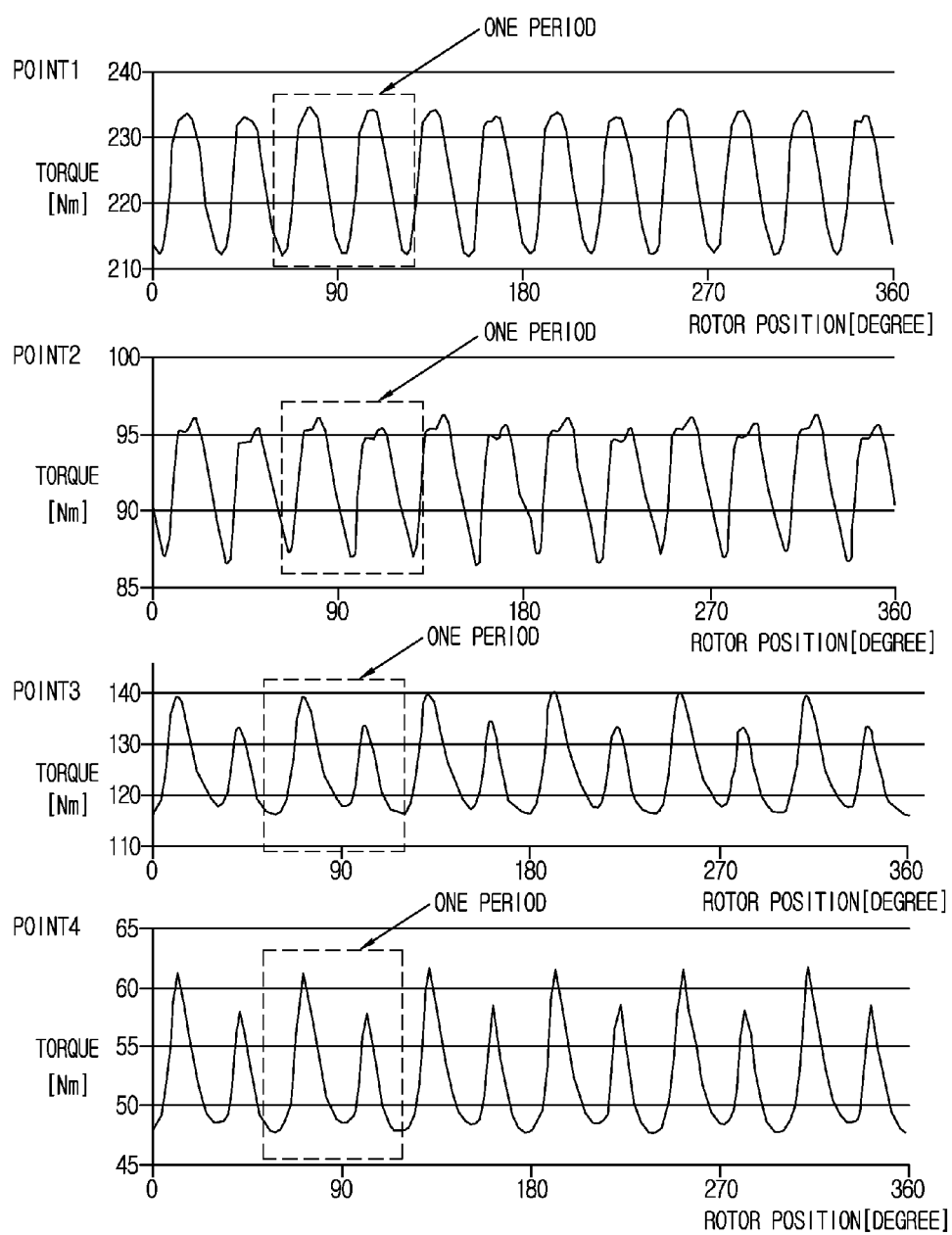
FIG. 4 is a plurality of graphs showing periods and shapes of torque ripple with respect to positions of the rotor in the respective operation regions shown in FIG. 3 (note the different torque ranges on the vertical axis of the plurality of graphs.

FIG. 4 is a plurality of graphs showing periods and shapes of torque ripple with respect to positions of the rotor in the respective operation regions shown in FIG. 3. POINT1 shows a period and a shape of torque ripple generated in the region A as a high torque section having uniform torque. POINT2 shows a period and a shape of torque ripple generated in the region B as a low torque region having uniform torque. POINT3 shows a period and a shape of torque ripple generated in the region C as a high torque region having reduced torque. POINT4 shows a period and a shape of torque ripple generated in the region D as a low torque region having reduced torque. As illustrated, the periods and the shapes of the torque ripples generated in the respective operation regions are different, so the periods and shapes of the negative phase ripple currents for reducing or canceling out them are also generated to be different.

Figure 6:
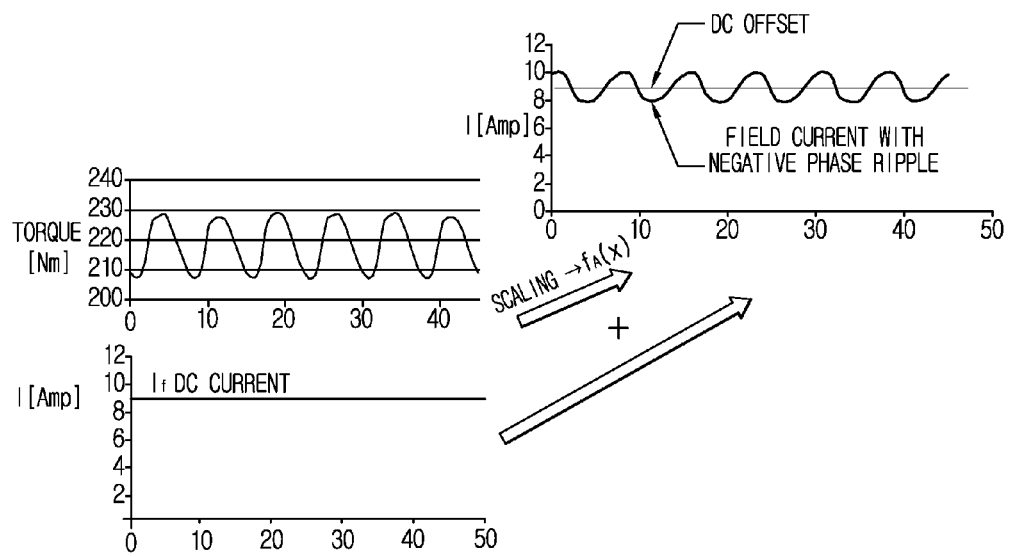
FIGS. 6 and 7 are views illustrating a process of reducing torque ripple by applying a negative phase ripple current using a field current to torque ripple in a high torque section of a first operation region according to an embodiment of the present disclosure.
Figure 7:
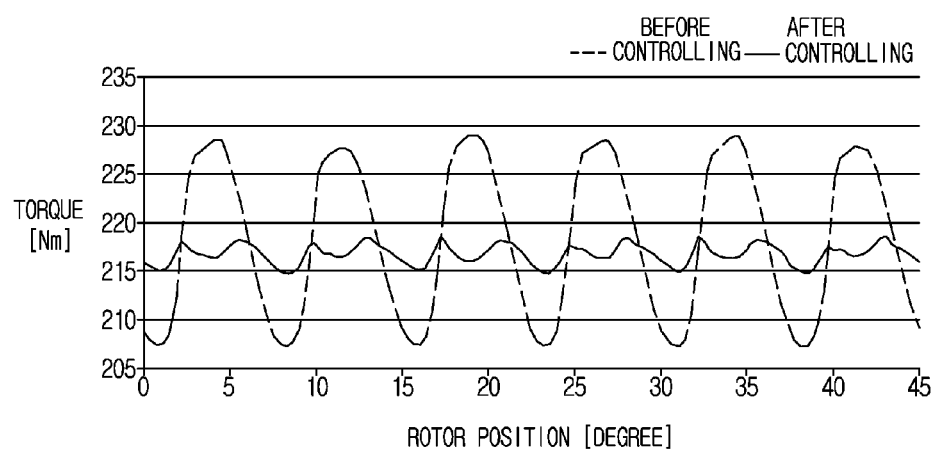

FIGS. 6 and 7 are views illustrating a process of reducing torque ripple by applying a negative phase ripple current to a baseline field current in a high torque section of the first operation region, i.e., POINT1, according to an embodiment of the present disclosure. As illustrated in FIG. 6, torque ripple generated in region A, to which POINT1 belongs, is scaled by a function $f_A(x)$, which converts the torque ripple to a proportional field current, and is then added to a baseline (DC) field current to generate a field current comprising a negative phase ripple. In region A, since the proportion of the magnetic torque ripple is large, the effect of reducing torque ripple using the field current $I_f$ is significant. FIG. 7 shows a result obtained by controlling the field current $I_f$ with the generated negative phase ripple current. It can be seen that torque ripple after the field current $I_f$ is controlled is reduced to about a quarter of torque ripple before the field current $I_f$ is controlled.

Figure 8:
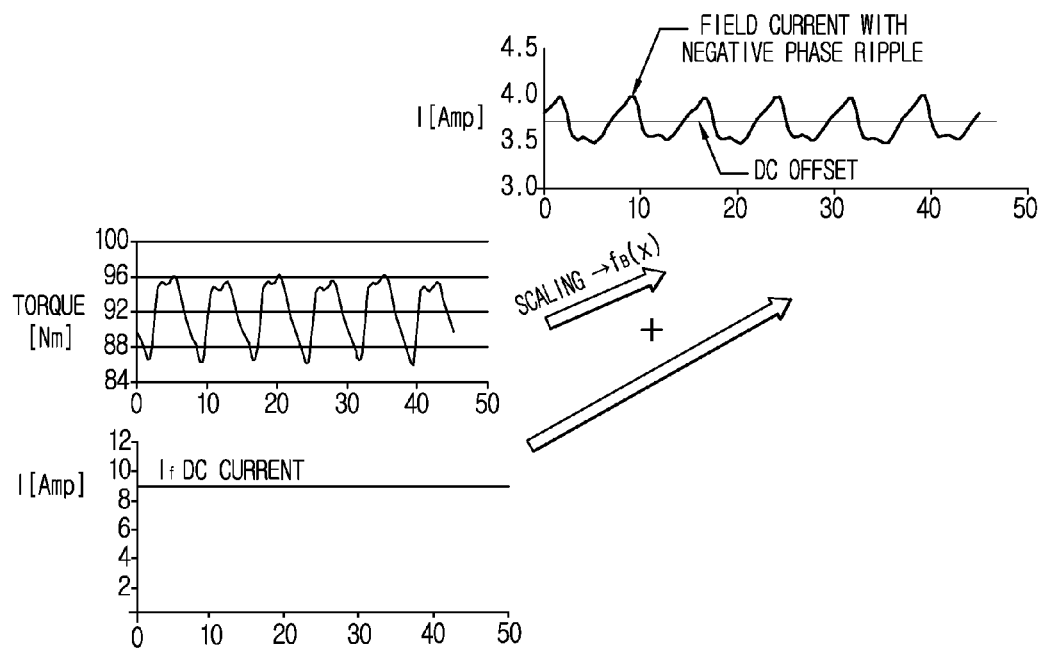
FIGS. 8 and 9 are views illustrating a process of reducing torque ripple by applying a negative phase ripple current using a field current to torque ripple in the low torque section of the first operation region according to an embodiment of the present disclosure.
Figure 9:
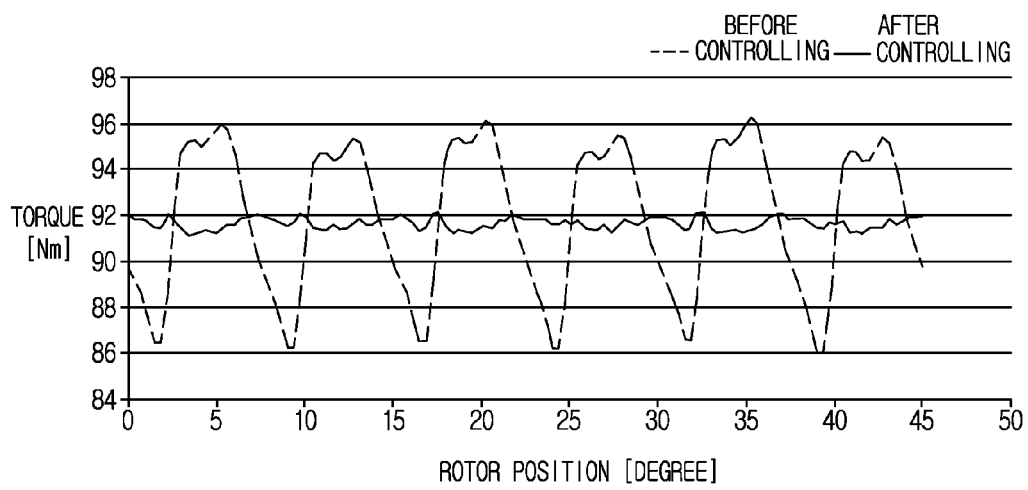

FIGS. 8 and 9 are views illustrating a process of reducing torque ripple by applying a negative phase ripple current to a baseline field current in the low torque section of the first operation region, i.e., POINT2, according to an embodiment of the present disclosure. As illustrated in FIG. 8, torque ripple generated in region B to which POINT2 belongs, is scaled by a function $f_B(x)$, which converts the torque ripple to a proportional field current, and is then added to a baseline (DC) field current to generate a field current comprising a negative phase ripple. In region B, since the proportion of the magnetic torque ripple is large while the magnitude of the torque generation current $I_q$ is relatively small in the torque ripple, the effect of reducing torque ripple using the field current $I_f$ is significant, and torque ripple can be reduced by reducing an AC component of the negative phase ripple current. FIG. 9 shows a result obtained by controlling the field current $I_f$ with the generated negative phase ripple current.

Figure 10:
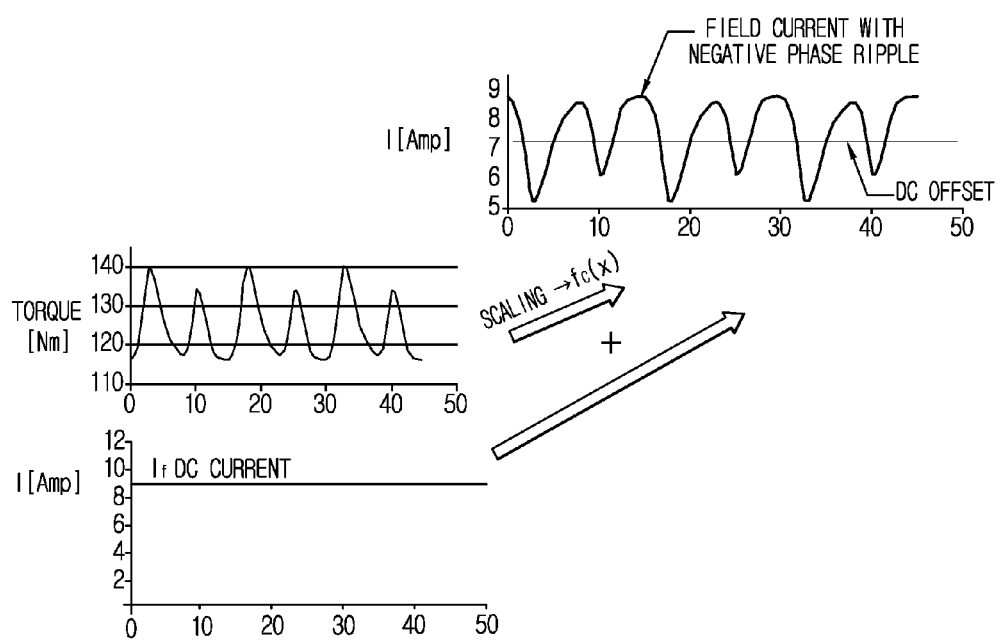
FIGS. 10 and 11 are views illustrating a process of reducing torque ripple by applying a negative phase ripple current using a field current to torque ripple in a high torque section of a second operation region according to an embodiment of the present disclosure.
Figure 11:
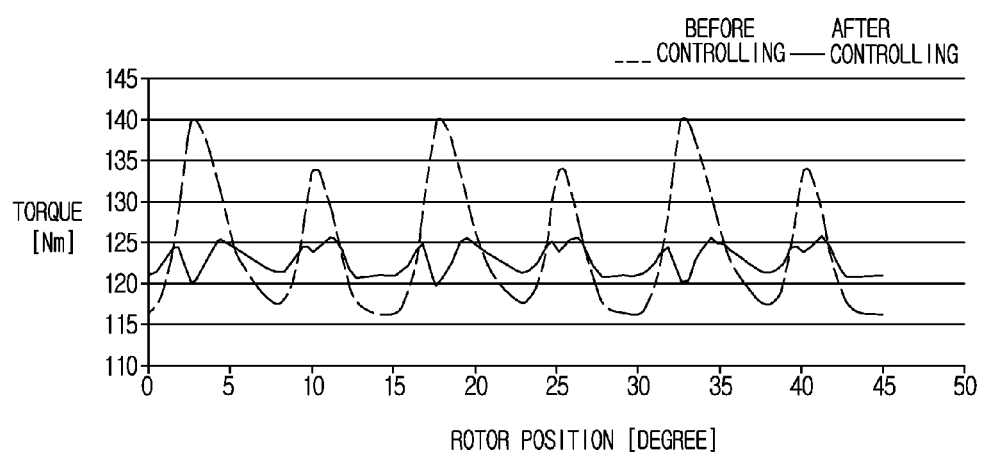

FIGS. 10 and 11 are views illustrating a process of reducing torque ripple by applying a negative phase ripple current to a baseline field current in a high torque section of a second operation region, i.e., POINT3, according to an is embodiment of the present disclosure. As illustrated in FIG. 10, torque ripple generated in region C, to which POINT3 belongs, is scaled by a function $f_C(x)$, which converts the torque ripple to a proportional field current, and is then added to a baseline (DC) field current to generate a field current comprising a negative phase ripple. In region C, since the proportion of the reluctance torque ripple is increased, the torque ripple is reduced by increasing the AC component of the negative phase ripple current. FIG. 11 shows a result obtained by controlling the field current $I_f$ with the generated negative phase ripple current.

Figure 5:
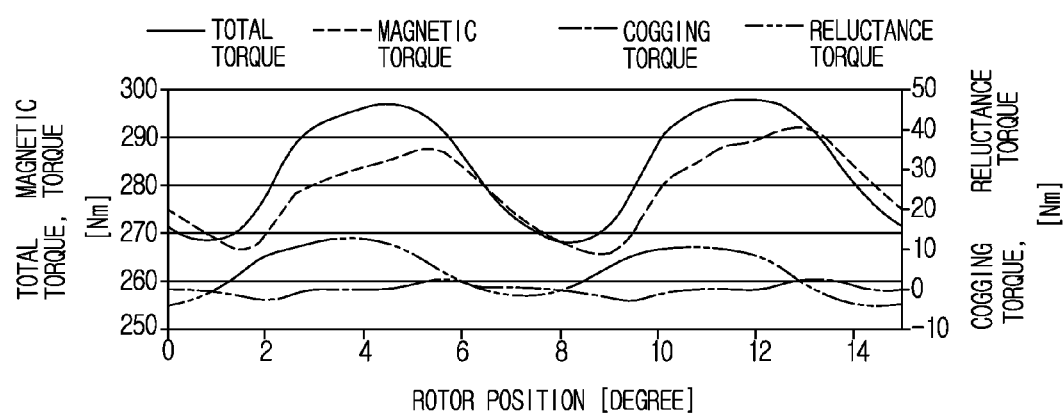
FIG. 5 is a graph showing an analysis of torque ripple of the motor generated according to positions of the rotor by discriminating reluctance torque, magnetic torque, and cogging torque according to an embodiment of the present disclosure.
Figure 12:
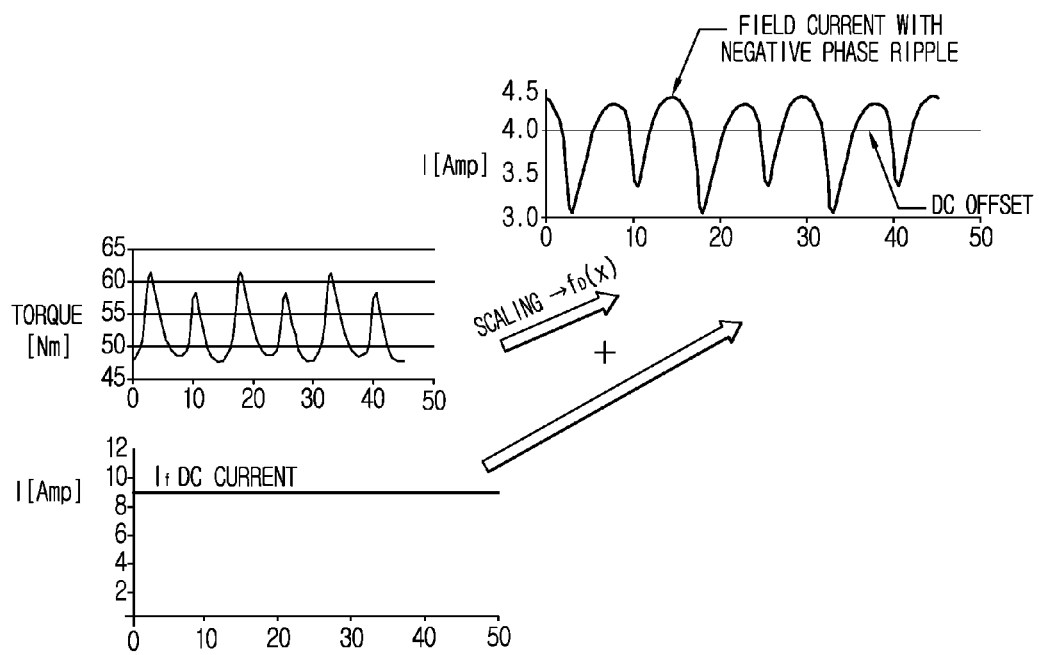
FIGS. 12 and 13 are views illustrating a process of reducing torque ripple by applying a negative phase ripple current using a field current to torque ripple in a low torque section of the second operation region according to an embodiment of the present disclosure.
Figure 13:
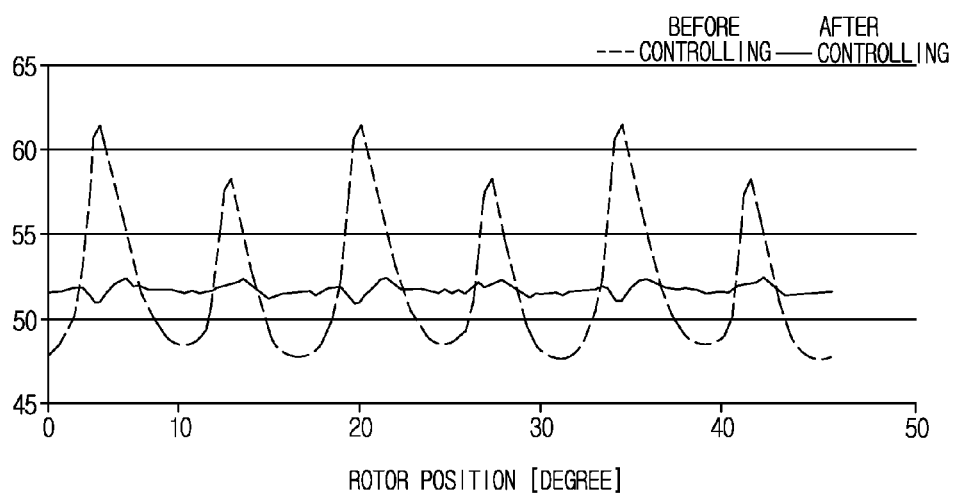

FIGS. 12 and 13 are views illustrating a process of reducing torque ripple by applying a negative phase ripple current to a baseline field current in a low torque section of the second operation region, i.e., POINT4, according to an embodiment of the present disclosure. As illustrated in FIG. 12, torque ripple generated in region D, to which POINT4 belongs, is scaled by a function $f_D(x)$, which converts the torque ripple to a proportional field current, and is then added to a baseline (DC) field current to generate a field current comprising a negative phase ripple. In comparison to region C, in region D, since a magnitude of the magnetic flux generation current $I_d$ as a current on the 2-phase synchronous coordinate system converted from the 3-phase output current of the inverter is relatively reduced, and thus, torque ripple can be reduced by reducing an AC component of the negative phase ripple current. FIG. 13 shows a result obtained by controlling the field current $I_f$ with the generated negative phase ripple current. Similarly, it can be seen that torque ripple after the field current $I_f$ is controlled is reduced to about a quarter of torque ripple before the field current $I_f$ is controlled FIG. 5 is a graph showing an analysis of total torque ripple of the motor generated according to positions of the rotor by discriminating reluctance torque, magnetic torque, and cogging torque according to an embodiment of the present disclosure. Output torque of the motor is the sum of reluctance torque, magnetic torque, and cogging torque as represented by equation shown below.

$$\text{Torque}=T_{magnetic}+T_{reluctance}+T_{cogging}$$

$$\text{Torque}=P_n\{L_f \times i_f \times i_q + (L_d-L_q) \times i_d i_q\} + T_{cogging}$$

Here, Pn is the number of poles of the rotor, Lf is field winding inductance, Ld is d axis inductance and Lq is q axis inductance.

Here, the magnetic torque includes the field current $I_f$ and the torque generation current $I_q$ components, and the reluctance torque includes the magnetic flux generation current $I_d$ and the torque generation current $I_q$ components. In an embodiment of the present disclosure, torque ripples are analyzed according to operation regions, and the field current $I_f$ of the magnetic torque is controlled accordingly, thus reducing torque ripple of the motor.

Here, the cogging torque has a very small magnitude in comparison to the reluctance torque and the magnetic torque. A value of the cogging torque is determined according to the number of poles of the rotor and the number of slots of the stator in designing or manufacturing the motor, so the proportion of the cogging torque in the total torque ripple is also small. However, in an embodiment of the present disclosure, since the field current control unit 40 controls the field current by generating a negative phase ripple current with respect to torque ripple reflecting ripple of the cogging torque, torque ripple can be more precisely reduced.

Hereinafter, a method for reducing torque ripple utilizing the apparatus for controlling a motor for an electric vehicle according to an embodiment of the present disclosure will be described.

Figure 16:
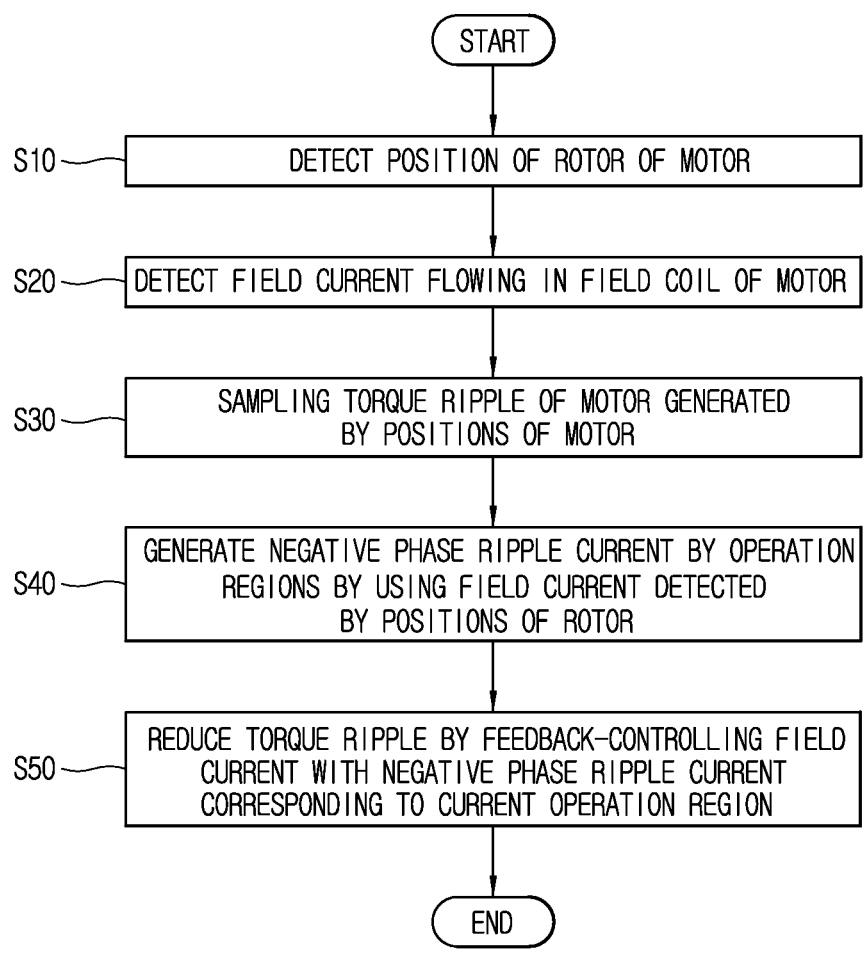
FIGS. 16 and 17 are flow charts illustrating a method for reducing torque ripple of an apparatus for controlling a motor for an electric vehicle according to an embodiment of the present disclosure.

First, referring to FIG. 16, a position of the rotor of the motor is detected by using a resolver, or the like (S10). A field current flowing in the field coil of the motor is detected (S20).

Torque ripple of the motor according to the detected rotational positions of the rotor is sampled (S30). The sampling of torque ripple of the motor (S30) may include detecting an output current, i.e., a 3-phase AC current, of the armature coil and analyzing total torque ripple of the motor generated according to rotational positions of the rotor by the reluctance torque including a 3-phase AC current and the magnetic torque including a field current component, based on a magnitude of the detected field current and a magnitude of the detected 3-phase AC current.

Thereafter, negative phase ripple currents with respect to the sampled torque ripple by the operation regions are generated by using field currents detected by rotational positions of the rotor (S40). Here, the operation regions may include a first operation region in which torque is uniform according to a rotation speed of the motor and a second operation region in which torque is reduced according to a rotation speed of the motor.

The field current is feedback-controlled with the negative phase ripple current corresponding to a current operation region to reduce torque ripple (S50). In detail, the field current is feedback-controlled such that a magnitude thereof is increased as a current operation region is shifted from a low torque section of the first operation region toward a high torque section or from a low torque section of the second operation region toward a high torque section of the second operation region, thereby reducing torque ripple. Also, the current operation region may be determined based on a torque reference received according to an accelerator is angle of the driver and a rotation speed of the motor calculated according to the signal received from the rotor position detection unit.

Figure 17:
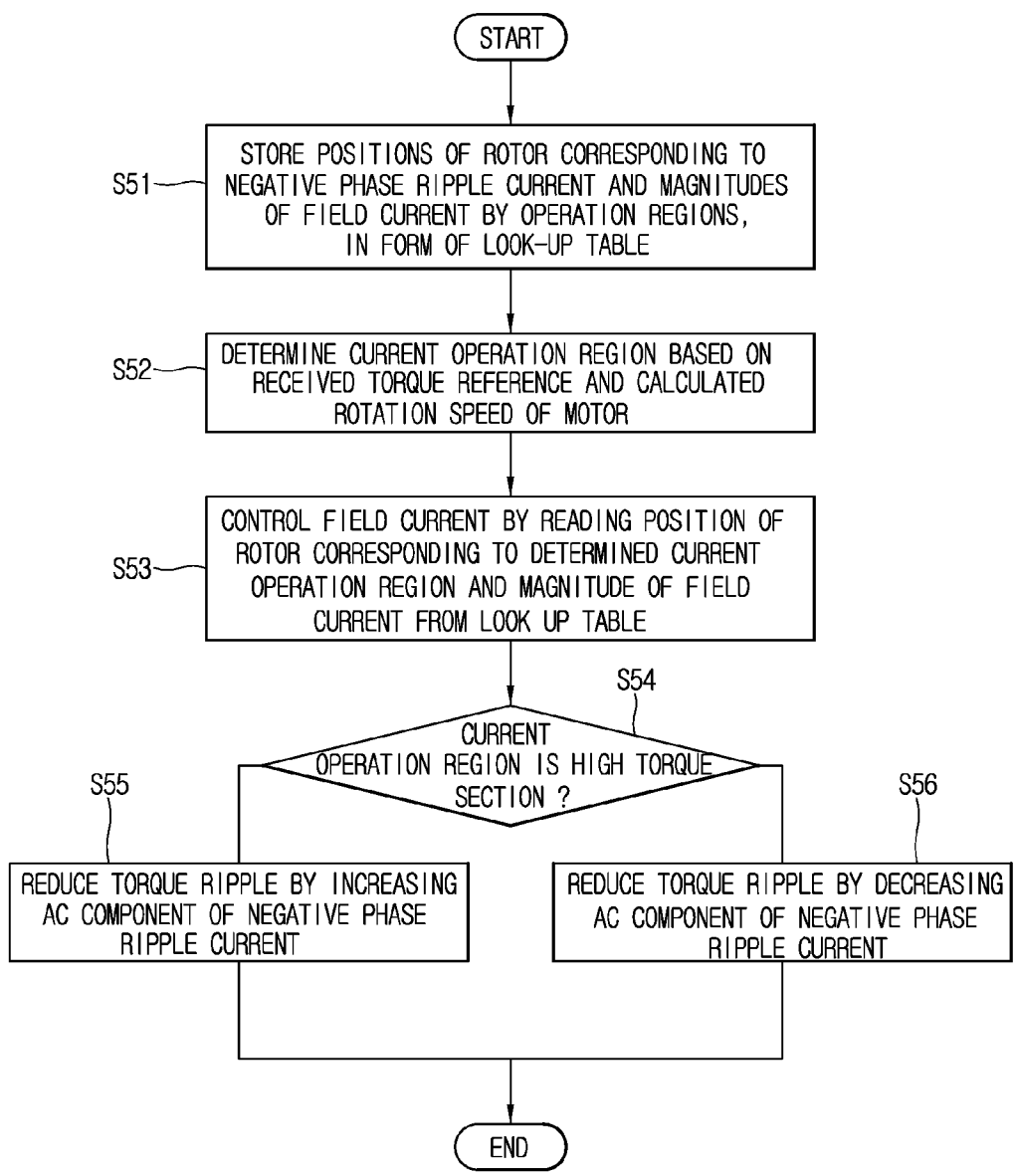

A detailed process for reducing torque ripple by feedback-controlling the field current with a negative phase ripple current is illustrated in FIG. 17.

First, positions of the rotor corresponding to negative phase ripple currents and magnitudes of the field currents in the respective operation regions are stored in the form of a look-up table in advance (S51). Thereafter, a current operation region is determined based on a received torque reference and a rotation speed of the motor calculated through the rotor position detection unit (S52). A position of the rotor corresponding to the determined current operation region and a magnitude of the field current are read from the look-up table, and the field current $I_f$ is feedback-controlled (S53).

Thereafter, it is determined whether or not the determined current operation region is a high torque section or a low torque section (S54). When the current operation region is a high torque section according to the determination result, torque ripple is reduced by increasing the AC component of the negative phase ripple current (S55). Meanwhile, when the current operation region is a low torque section according to the determination result, torque ripple is reduced by reducing the AC component of the negative phase ripple current (S56).

As described above, in the case of the apparatus for controlling a motor for an electric vehicle and a method for reducing torque ripple using the same according to embodiments of the present disclosure, since a field current flowing in the field coil is controlled by generating a negative phase ripple current with respect to torque ripple is generated according to each position of the rotor of the motor, torque ripple of the motor can be reduced without degrading output torque.

What is claimed is:

1. An apparatus controlling an electric vehicle motor, the apparatus comprising:
   a motor including a stator having an armature coil and a rotor having a field coil;

a rotor position detection unit to detect a position of the rotor; and
a field current control unit having
a field current detection unit to detect a field current flowing in the field coil; and
a feedback control unit for feedback-controlling the detected field current,
wherein an operation region is determined based on a torque reference received according to an accelerator angle of a driver and a rotation speed of the motor calculated according to a signal received from the rotor position detection unit,
wherein the field current control unit generates a negative phase ripple current for each operation region by using a baseline field current detected at each position of the rotor, and feedback-controlling the field current with the generated negative phase ripple current to reduce torque ripple of the motor while maintaining a phase of an output current applied to the armature coil,
wherein the operation region is separated to a first operation region and a second operation region according to a rotation speed of the motor,
wherein a maximum torque of the first operation region is uniform according to the rotation speed of the motor and a maximum torque of the second operation region is variable according to the rotation speed of the motor,
wherein the field current control unit increases an AC component of the negative phase ripple current when the torque reference is increased in the first operation region.

2. The apparatus of claim 1, wherein the field current control unit increases the AC component of the negative phase ripple current when the torque reference is increased in the second operation region.

3. The apparatus of claim 2, wherein the first operation region includes a first section and a second section, in which the torque reference of the first section is higher than the torque reference of the second section at each rotation speed of the motor,
wherein the second operation region includes a third section and a fourth section, in which the torque reference of the third section is higher than the torque reference of the second section at each rotation speed of the motor, and
wherein the field current control unit changes the AC component of the negative phase ripple current when a transition among the first section, second section, third section and fourth section is occurred.

4. An apparatus controlling an electric vehicle motor, the apparatus comprising:
a motor including a stator having an armature coil and a rotor having a field coil;
a rotor position detection unit to detect a position of the rotor; and
a field current control unit having
a field current detection unit to detect a field current flowing in the field coil; and
a feedback control unit for feedback-controlling the detected field current,
an output current detection unit configured to detect an output current of the armature coil,
wherein an operation region is determined based on a torque reference received according to an accelerator angle of a driver and a rotation speed of the motor calculated according to a signal received from the rotor position detection unit,
wherein the field current control unit generates a negative phase ripple current for each operation region by using a baseline field current detected at each position of the rotor, and feedback-controlling the field current with the generated negative phase ripple current to reduce torque ripple of the motor while maintaining a phase of the output current applied to the armature coil,
wherein the field current control unit generates a negative phase ripple current proportional to a magnitude of the output current which is combined with the baseline field current.

5. The apparatus of claim 3, wherein when the current operation region is the first section or the third section, the field current control unit reduces torque ripple of the motor by increasing an AC component of the generated negative phase ripple current.

6. The apparatus of claim 3, wherein when the current operation region is the second section or the fourth section, the field current control unit reduces torque ripple of the motor by decreasing an AC component of the generated negative phase ripple current.

7. The apparatus of claim 3, wherein when the operation region is shifted from the first section to the third section or the second section to the fourth section the field current control unit decreases an AC component of the negative phase ripple current.

8. The apparatus of claim 1, wherein the field current control unit stores positions of the rotor corresponding to negative phase ripple currents for reducing the torque ripple and magnitudes of the field current by operation region in a look-up table.

9. The apparatus of claim 8, wherein the field current control unit corrects a magnitude of the detected field current by reading a position of the rotor and a magnitude of the field current corresponding to the determined operation region.

10. The apparatus of claim 1, wherein the torque ripple includes cogging torque ripple, and
the field current control unit generates the negative phase ripple current for reducing torque ripple including the ripple of the cogging torque.

11. The apparatus of claim 10, wherein a magnitude of the torque ripple is inversely proportional to a number of poles of the rotor, and
the field current control unit controls a magnitude of the field current to be reduced as the number of poles of the rotor is increased.

12. The apparatus of claim 1, further comprising:
a battery; and
an inverter configured to convert DC power from the battery into a 3-phase AC current, and supply the 3-phase AC current to the armature coil to drive the motor.

13. A method to reduce torque ripple by an apparatus controlling an electric vehicle motor including a stator with an armature coil and a rotor with a field coil, the method comprising:
detecting a position of the rotor;
detecting a field current flowing in the field coil;
sampling torque ripple of a motor generated according to each position of the rotor;
determining a current operation region based on a torque reference received according to an accelerator angle of a driver and a rotation speed of the motor calculated according to a signal received from a rotor position detection unit;
generating a negative phase ripple current as a sampled function of the sampled torque ripple for each operation region; and feedback-controlling the field current with the negative phase ripple current corresponding to the current operation region while maintaining a phase of an output current applied to the armature coil, wherein the operation region is separated to a first operation region and a second operation region according to a rotation speed of the motor, wherein a maximum torque of the first operation region is uniform according to the rotation speed of the motor and a maximum torque of the second operation region is variable according to the rotation speed of the motor, and wherein an AC component of the negative phase ripple current is increased as the torque reference is increased in the first operation region.

14. The method of claim 13, wherein the sampling torque ripple of the motor comprises:

detecting an output current of the armature coil; and analyzing, according to positions of the rotor, torque ripple of the motor generated by reluctance torque and magnetic torque based on the magnitudes of the detected field current and the detected output current.

15. The method of claim 13, wherein the AC component of the negative phase ripple current is increased as the torque reference is increased in the second operation region.

16. The method of claim 15, wherein the first operation region includes a first section and a second section, in which the torque reference of the first section is higher than the torque reference of the second section at each rotation speed of the motor, wherein the second operation region includes a third section and a fourth section, in which the torque reference of the third section is higher than the torque reference of the second section at each rotation speed of the motor, and wherein the AC component of the negative phase ripple current is changed when a transition among the first section, second section, third section and fourth section is occurred.

17. The method of claim 13, further comprising:

storing positions of the rotor corresponding to negative phase ripple currents for reducing the torque ripple and magnitudes of the field current in respective operation regions in a look-up table.

18. The method of claim 17, wherein the reducing of the torque ripple comprises:

feedback-controlling the field current by reading a position of the rotor corresponding to the determined current operation region and a magnitude of the field current from the look-up table.

19. The method of claim 16, wherein, in the reducing of the torque ripple, when the current operation region is the first section or the third section, the torque ripple is reduced by increasing an AC component of a negative phase ripple current, and when the current operation region is the second section or the fourth section, the torque ripple is reduced by decreasing an AC component of a negative phase ripple current.

\* \* \* \* \*